(12) United States Patent
Goss et al.

(10) Patent No.: US 9,411,717 B2
(45) Date of Patent: Aug. 9, 2016

(54) METADATA JOURNALING WITH ERROR CORRECTION REDUNDANCY

(71) Applicant: Seagate Technology LLC, Cupertino, CA (US)

(72) Inventors: Ryan James Goss, Prior Lake, MN (US); David Scott Seekins, Shakopee, MN (US); Mark Allen Gaertner, Vadnais Heights, MN (US)

(73) Assignee: Seagate Technology LLC, Cupertino, CA (US)

( * ) Notice: Subject to any disclaimer, the term of this patent is extended or adjusted under 35 U.S.C. 154(b) by 437 days.

(21) Appl. No.: 13/658,643

(22) Filed: Oct. 23, 2012

(65) Prior Publication Data

US 2014/0115232 A1 Apr. 24, 2014

(51) Int. Cl.
*G06F 12/00* (2006.01)
*G06F 12/02* (2006.01)
*G06F 11/10* (2006.01)
*G06F 11/14* (2006.01)

(52) U.S. Cl.
CPC ........ *G06F 12/0246* (2013.01); *G06F 11/1012* (2013.01); *G06F 11/1471* (2013.01)

(58) Field of Classification Search
CPC .................................................. G06F 12/0246
USPC .................................................. 711/103, 160
See application file for complete search history.

(56) References Cited

U.S. PATENT DOCUMENTS

| | | | |
|---|---|---|---|
| 8,082,232 B2 | 12/2011 | Okada et al. | |
| 8,762,342 B1 * | 6/2014 | Krishnamurthy et al. | 707/649 |
| 2003/0158873 A1 * | 8/2003 | Sawdon et al. | 707/204 |
| 2005/0015416 A1 | 1/2005 | Yamagami | |
| 2007/0162513 A1 * | 7/2007 | Lewin et al. | 707/200 |
| 2007/0214334 A1 * | 9/2007 | Maruyama et al. | 711/165 |
| 2008/0077590 A1 | 3/2008 | Pandit | |
| 2008/0168218 A1 * | 7/2008 | Arakawa et al. | 711/112 |
| 2009/0013012 A1 * | 1/2009 | Ichikawa et al. | 707/204 |
| 2009/0150599 A1 * | 6/2009 | Bennett | 711/103 |
| 2011/0078512 A1 * | 3/2011 | Grube et al. | 714/42 |
| 2011/0185113 A1 * | 7/2011 | Goss et al. | 711/103 |
| 2011/0191522 A1 | 8/2011 | Condict et al. | |
| 2012/0030260 A1 * | 2/2012 | Lu et al. | 707/820 |
| 2012/0079318 A1 * | 3/2012 | Colgrove et al. | 714/6.22 |
| 2012/0303866 A1 * | 11/2012 | Bandic et al. | 711/103 |

* cited by examiner

*Primary Examiner* — Yaima Rigol
*Assistant Examiner* — Tasnima Matin
(74) *Attorney, Agent, or Firm* — Hall Estill Attorneys at Law

(57) ABSTRACT

Method and apparatus for managing a memory, such as but not limited to a flash memory. In accordance with some embodiments, user data and associated metadata are stored in a memory. The metadata are arranged as a first sequence of snapshots of the metadata at different points in time during the operation of the memory, and a second sequence of intervening journals which reflect updates to the metadata from one snapshot to the next. Requested portions of the metadata are recovered from the memory using a selected snapshot in the first sequence and first and second journals in the second sequence.

20 Claims, 4 Drawing Sheets

TIME

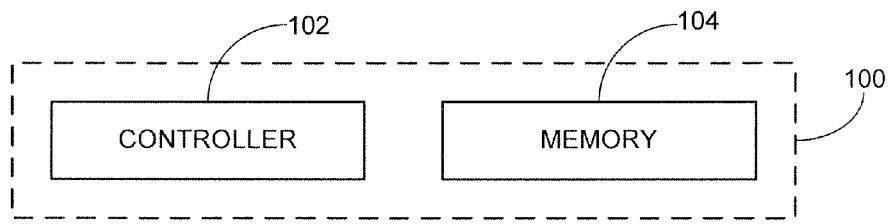
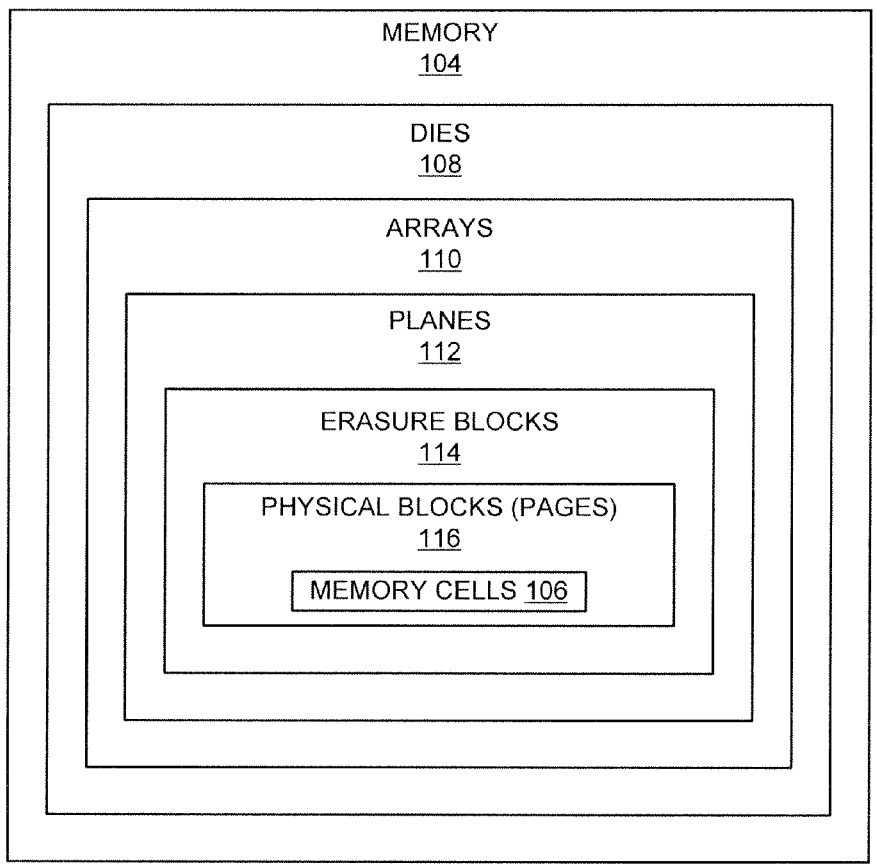
FIG. 1
FIG. 2

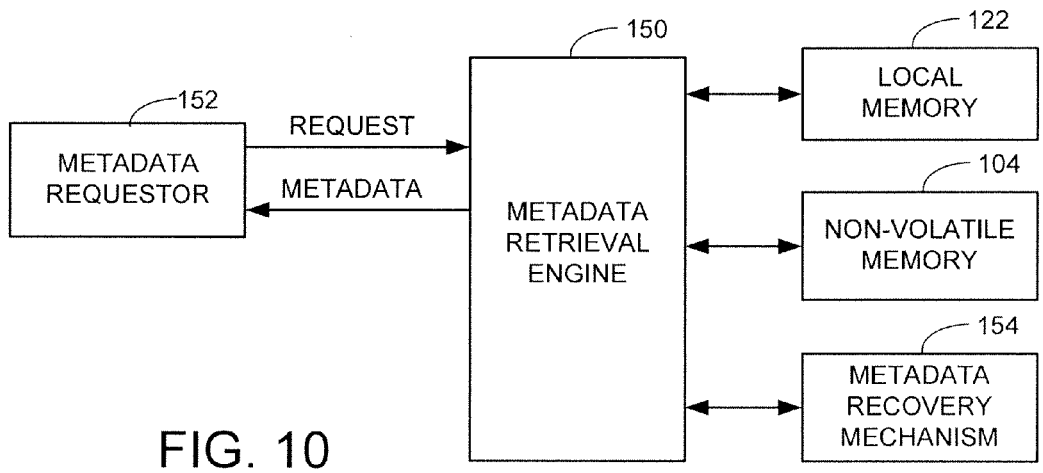
FIG. 10
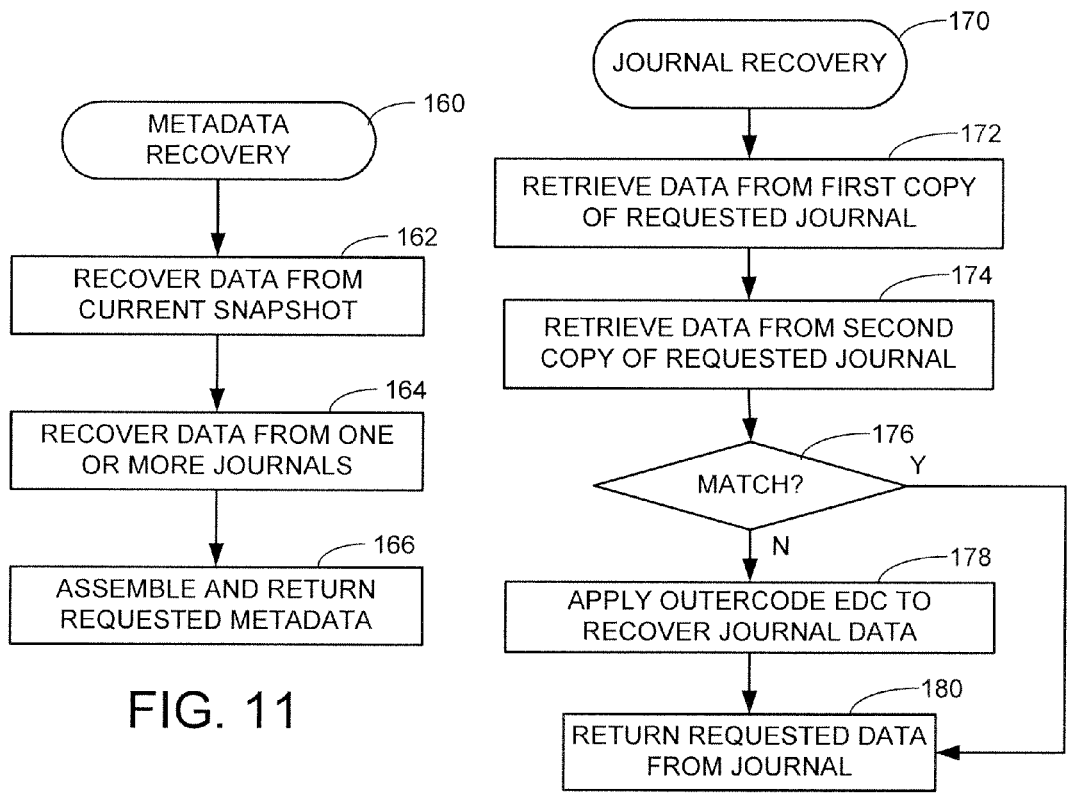
FIG. 11
FIG. 12

METADATA JOURNALING WITH ERROR CORRECTION REDUNDANCY

SUMMARY

Various embodiments of the present disclosure are generally directed to a method and apparatus for managing data in a memory, such as but not limited to a flash memory.

In accordance with some embodiments, user data and associated metadata are stored in a memory. The metadata are arranged as a first sequence of snapshots of the metadata at different points in time during the operation of the memory, and a second sequence of intervening journals which reflect updates to the metadata from one snapshot to the next. Requested metadata are recovered from the memory using a selected snapshot in the first sequence and first and second journals in the second sequence.

These and other features which may characterize various embodiments can be understood in view of the following detailed discussion and the accompanying drawings.

BRIEF DESCRIPTION OF THE DRAWINGS

FIG. 1 provides a functional block representation of a data storage device arranged to communicate with a host device in accordance with some embodiments of the present disclosure.

FIG. 2 shows a hierarchy of addressable memory levels in the memory of FIG. 1.

FIG. 10 provides a functional block diagram of a metadata retrieval engine adapted to retrieve requested metadata.

FIG. 11 is a METADATA RECOVERY routine illustrative of steps that may be carried out by the metadata retrieval engine.

FIG. 12 is a JOURNAL RECOVERY routine illustrative of steps that may be carried out during the routine of FIG. 11.

DETAILED DESCRIPTION

Figure 3:
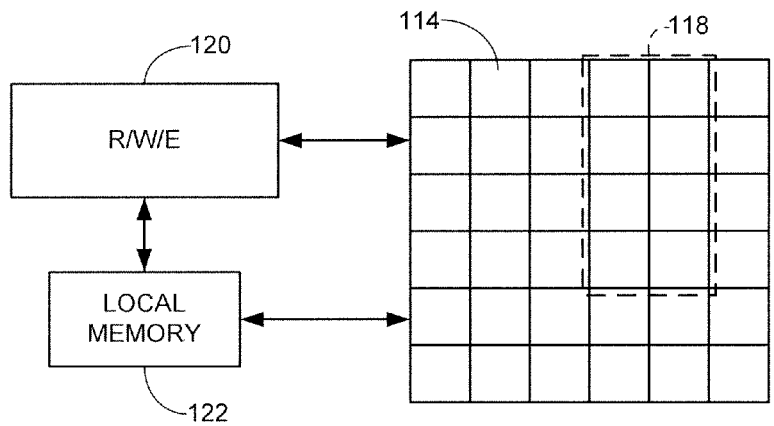
FIG. 3 illustrates a portion of the memory of FIGS. 1-2 in conjunction with a read/write/erase (R/W/E) circuit.

The present disclosure generally relates to the management of data in a memory, such as but not limited to a flash memory of a data storage device.

Data storage devices generally operate to store blocks of data in memory. Some memories employ data management systems to track the physical locations of the blocks so that the blocks can be subsequently retrieved responsive to a read request for the stored data.

Some forms of data storage devices, such as solid state drives (SSDs), can be arranged to write data to a new available location each time a block is presented for writing. Over time, multiple versions of the same block may persist in memory, with one of the versions being the most current data and the remaining versions being older, stale data. Metadata can be generated and used to track the locations and status of the stored data. The metadata may track the relationship between logical and physical addresses of the blocks as well as other state information associated with the user data.

Data management systems often expend considerable effort in maintaining the metadata in an up-to-date and accurate condition. Metadata failures can occur from time to time due to a variety of factors, including loss or corruption of the stored metadata, failures in the circuitry used to access the metadata, incomplete updates of the metadata during a power interruption, etc. In some cases, a metadata failure may result in an older version of data being returned to the host. In other cases, a metadata failure may render the entire device inoperable.

In some storage systems, certain types of metadata relating to the state of the system may be updated on a highly frequent basis. A staleness count, indicative of the total number of stale blocks in a GCU, may be incremented during each write operation to that GCU. In high performance environments, this may result in several tens of thousands, or hundreds of thousands (or more) of state changes per second. Other types of state information may be similarly updated at a high rate, such as aging (e.g., data retention values) associated with the GCUs.

Accordingly, various embodiments of the present disclosure generally operate to accumulate updates to metadata in local memory in the form of a journal, and to periodically transfer complete snapshots of the metadata to a non-volatile memory array. An up-to-date set of the metadata can be expressed in relation to the most recent snapshot and the current journal.

Multiple previous snapshots and multiple intervening journals are stored in the array. Error correction techniques are applied to the journals. In this way, the system can recover an up-to-date set of metadata even in the event of a recovery error associated with at least one snapshot and/or at least one journal. In some embodiments, a voting process is employed to evaluate different journals. In further embodiments, multiple recovery paths for the data associated with a given journal may be implemented concurrently.

FIG. 1 provides a simplified block diagram of a data storage device 100. The device 100 includes a controller 102 and a memory module 104. The controller 102 provides top level control for the device, and may be realized as a hardware based or programmable processor. The memory module 104 provides a main data store for the device 100, and may be a solid-state memory array, disc based memory, etc. While not limiting, for purposes of providing a concrete example the device 100 will be contemplated as a non-volatile data storage device that utilizes flash memory in the memory 104 to provide a main memory for a host device (not shown).

FIG. 2 illustrates a hierarchical structure for the memory 104 in FIG. 1. The memory 104 includes a number of addressable elements from a highest order (the memory 104 itself) to lowest order (individual flash memory cells 106). Other structures and arrangements can be used.

The memory 104 takes the form of one or more dies 108. Each die may be realized as an encapsulated integrated circuit (IC) having at least one physical, self-contained semiconductor wafer. The dies 108 may be affixed to a printed circuit board (PCB) to provide the requisite interconnections. Each die incorporates a number of arrays 110, which may be realized as a physical layout of the cells 106 arranged into rows and columns, along with the associated driver, decoder and sense circuitry to carry out access operations (e.g., read/write/erase) upon the arrayed cells.

The arrays 110 are divided into planes 112 which are configured such that a given access operation can be carried out concurrently to the cells in each plane. An array 110 with eight planes 112 can support eight concurrent read operations, one to each plane.

The cells 106 in each plane 112 are arranged into individual erasure blocks 114, which represent the smallest number of memory cells that can be erased at a given time. Each erasure block 114 may in turn be formed from a number of pages (rows) 116 of memory cells. Generally, an entire page worth of data is written or read at a time.

FIG. 3 illustrates a portion of the memory 104 arranged as a plurality of erasure blocks 114. The blocks may be grouped into garbage collection units 118, which are allocated, used and erased as a unit. A garbage collection operation may involve transferring current version data to a different location such as an active GCU, erasing the erasure blocks in the GCU, and placing the erased GCU into an allocation pool pending subsequent allocation.

A read/write/erase (R/W/E) circuit 120 communicates with the memory 104 to carry out these operations. Local memory 122 serves as a buffer for programming, transferred data and metadata. The local memory 122 may be volatile or non-volatile and may take a hierarchical form. The metadata constitutes control information to enable the system to accurately locate the data stored in the memory 104. The metadata can take a variety of forms and data structures depending on the configuration of the system, such as but not limited to logical address to physical address conversion tables, GCU sequence and time/date stamp information, validity flags, staleness counts, parametric data associated with the GCUs, read counts, write/erasure counts and forward pointers.

The metadata associated with each GCU 118 may be stored in a portion of that GCU, or in other locations in memory, and retrieved to the local memory 122 when required to support an access operation (e.g., a write operation, a read operation, etc.) associated with the GCU. The metadata may be arranged to include forward pointers that point to a different location in memory. When a new data block is to be written to the memory 104 having a particular logical address (e.g., logical block address, LBA), the previously current version of that LBA is marked as stale and the metadata are updated to provide a forward pointer that points to the new location where the new current version of the LBA is stored.

Figure 4:
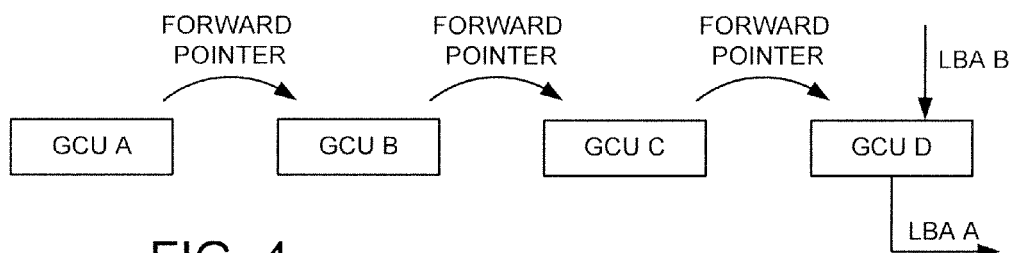
FIG. 4 shows a metadata forward search sequence that may be employed during read and write access operations.

FIG. 4 generally represents forward search operations carried out during access operations to read and write data. A read operation retrieves the most recent version of a selected LBA from an allocated GCU, and a write operation writes a new LBA to an allocated GCU. To read an existing LBA, denoted as "LBA A" in FIG. 4, a metadata search methodology begins by identifying the oldest active GCU and searching the metadata to determine whether the GCU has any entries associated with the requested LBA. The oldest GCU, which is denoted "GCU A," can be identified by examining GCU sequence metadata for each of the allocated GCUs in the active stage, and locating the GCU with the oldest sequence number.

The metadata associated with GCU A are examined to determine whether any entries exist for LBA A within the GCU. The sequence of FIG. 4 indicates that GCU A includes an entry for LBA A having a forward pointer to GCU B. The system proceeds to load and examine the metadata for GCU B, which provide an entry with a forward pointer to GCU C. The metadata for GCU C in turn provide an entry with a forward pointer to GCU D. The metadata for GCU D have a current entry indicating the physical address of the most current version of LBA A within GCU D (this may be described in terms of page, bits, offset, etc.). The system proceeds with a read operation upon this location and the requested LBA is output and returned to the host.

If the oldest active GCU does not provide an entry for the requested LBA, the system proceeds to search the next oldest active GCU and so on until either a forward pointer is located, the most current version of the LBA is located, or the data block is not found.

The forward search methodology of FIG. 4 is also performed during a write operation to write a block of data ("LBA B"). The metadata search begins by locating the oldest active GCU (GCU A) and searching for forward pointer entries for LBA B. As shown in FIG. 4, pointers are successively followed from GCU A to GCU B and from GCU B to GCU C. At this point it will be noted that the same GCU sequence is being followed in FIG. 4 for both the read operation for LBA A and the write operation for LBA B, although it will be appreciated that each access operation may follow its own GCU sequence along the forward search. It will also be appreciated that the forward pointers may point to other locations within the same GCU and do not necessarily point to a different GCU each time.

The metadata in GCU C identify the "then-existing" current version of LBA B in GCU C. The system proceeds to write the new version of LBA B to the next available allocated location, which is in GCU D. The system further marks the previous version of LBA B in GCU C as stale, and adds a forward pointer to GCU D.

Other metadata updates may take place as well to update state information associated with the system. These state information updates may include updating write and read counts, recording the results of temperature measurements, updating a staleness count for GCU C, etc. The metadata necessary to service the foregoing read and write operations may be swapped from non-volatile memory (e.g., from the GCUs A-D) to the local volatile memory 122 as needed.

Figure 5:
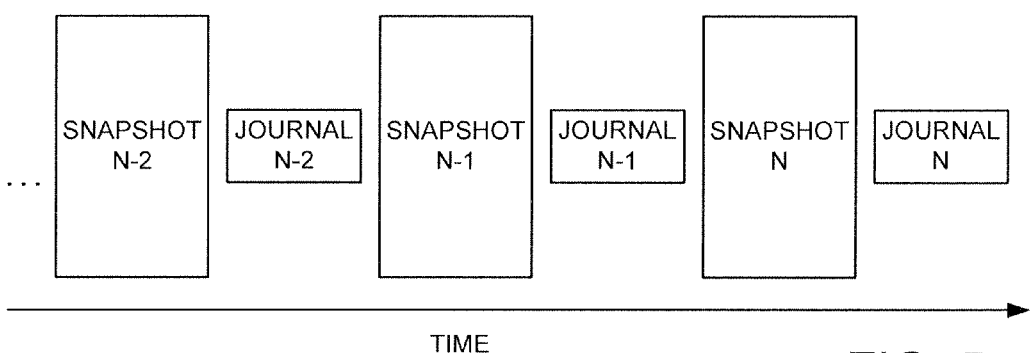
FIG. 5 illustrates a first sequence of metadata snapshots and a second sequence of intervening metadata journals maintained by the device of FIG. 1 in the memory.

FIG. 5 represents a sequence of metadata snapshots and intervening journals maintained by the system in accordance with various embodiments. The snapshots are periodic sets of metadata which reflect, at the associated time at which the snapshots were generated, an up-to-date representation of the state of the system. The journals represent updates to the metadata between successive snapshots.

Associated time/date stamp or other aging information may be stored with each snapshot. The most recent snapshot is identified as Snapshot N, the immediately previous snapshot is Snapshot N−1, and the second most previous snapshot is Snapshot N−2. As time progresses, new snapshots are generated and added to the sequence.

The snapshots are stored in the memory 104 or other secure location. The frequency at which the snapshots are generated will vary depending on the system requirements. In one example, the snapshots are formed on a predetermined periodic basis, such as every few minutes to several hours. In another example, the snapshots are formed after a certain number of access operations (e.g., X writes, etc.) have been performed. In yet another example, the snapshots are formed once the journals reach a certain size (e.g., Y MB, etc.).

The most current journal is represented as Journal N, the next most recent journal is Journal N−1, and the second most recent journal is Journal N−2. Journal N undergoes continuous updating whereas the contents of Journals N−1 and N−2 (as well as all of the snapshots) are fixed. Metadata updates are accumulated in Journal N until time for the next snapshot (Snapshot N+1, not shown) at which point the next snapshot will be generated by combining the contents of Snapshot N with the contents of Journal N.

At a given time T1, a complete and up-to-date set of metadata can be obtained by combining the most recent snapshot with the most recent journal such as:

$$M(T1)=J(T1)+S(N) \qquad (1)$$

where M(T1) is the metadata set at time T1, J(T1) is the most current journal (Journal N) at time T1, and S(N) is the most recent snapshot (Snapshot N). It will be appreciated that the current metadata set can also be derived as:

$$M(T1)=J(T1)+S(N-1)+J(N-1) \qquad (2)$$

or $$M(T1)=J(T1)+S(N-2)+J(N-1)+J(N-2) \qquad (3)$$

where J(N−1) is the previous Journal N−1, S(N−1) is the previous Snapshot N−1, J(N−2) is the second previous Journal N−2, and S(N−2) is the second previous Snapshot N−2. This relation holds since, if Snapshot B=Snapshot A+Journal A and Snapshot C=Snapshot B+Journal B, then Snapshot C=Snapshot A+Journal A+Journal B and so on (e.g., Snapshot D=Snapshot A+Journal A+Journal B+Journal C, etc.).

While FIG. 5 only shows three levels of snapshots and three levels of journals, it will be appreciated that other respective numbers of snapshots and journals can be stored in the system, and recovery efforts can extend backwards in time with the storage of additional snapshot and journal levels. While computationally intensive, any given journal can be derived by comparing two successive snapshots and noting the changes therebetween.

The above alternative relations of equations (1)-(3) show that if an error condition arises during the retrieval of data associated with Snapshot N, the complete set of metadata can be recovered using multiple journals and a previous snapshot (e.g., Snapshots N−1 or N−2). Each recovery operation, however, requires that the most recent journal information (Journal N) be recoverable and, in at least some cases, requires that at least one other journal (e.g., Journal N−1) be recoverable.

The snapshots can be relatively large from a data storage standpoint. It has been found in some applications that each metadata snapshot copy can require on the order of from less than about 0.1% to about 1% or more of the total data storage capacity of an a memory array. Journal entries tend to be significantly smaller than the snapshots, with a size that may be several orders of magnitude (e.g., $10^{-3}\times$) smaller than the snapshots.

The device 100 is configured to use a multi-level redundancy approach to ensure the metadata can be recovered. In one embodiment, the device 100 maintains, at all times, two copies of the three most recent snapshots (e.g., Snapshots N−2, N−1 and N in FIG. 5). The copies of the oldest snapshot are marked for garbage collection as each new snapshot is added to the array. In addition, at least two copies of the three most recent journals (e.g., Journals N−2, N−1 and N) are maintained by the device, plus at least one virtual copy of the journals generated using error detection and correction (EDC) techniques. In some embodiments, additional layers of protection are applied to the most recent journal (Journal N) since this journal entry is usually necessary to recover the metadata set.

Figure 6:
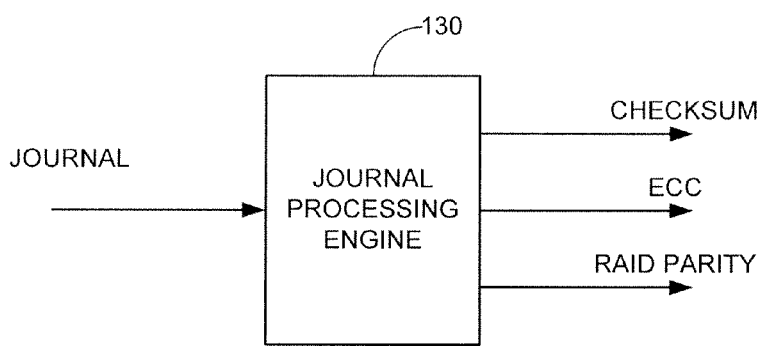
FIG. 6 provides a functional block representation of a journal processing engine operative to process a journal from FIG. 4 in accordance with various error detection and correction (EDC) schemes.

FIG. 6 shows a journal processing engine 130 that operates in accordance with some embodiments to generate virtual copies of the journals. The engine 130 can be realized in hardware, software or firmware, and can form any suitable portion of the device 100 including a portion of the R/W/E circuit 120 or the controller 102. As shown in FIG. 6, the engine 130 generates error detection and correction (EDC) codes for an input journal. In some cases, the engine 130 may generate multiple forms of EDC codes for the same journal such as checksums, Reed-Solomon error correction codes (ECC), and parity data sets (such as RAID-5 data sets, etc.).

Figure 7:
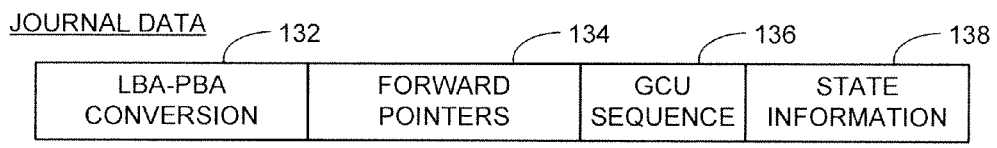
FIG. 7 is an example format for journal data.

Different aspects of the journal data may be subjected to different levels of redundancy. FIG. 7 is a simplified representation of the types of data that may be included in each journal entry. Other forms can be used. The data may include physical-logical address conversion data 132 (e.g., logical block address, LBA to physical block address, PBA), forward pointers 134, GCU sequencing data 136, and state information 138 (e.g., read/write counts, erasures, staleness counts, aging, etc.). The redundancy strategy may provide different levels of protection for these different types of metadata. The forward pointer data may be protected to a greater extent than the state information on the basis that the state information is not necessarily required to facilitate the recovery of user data from the array.

Figure 8:
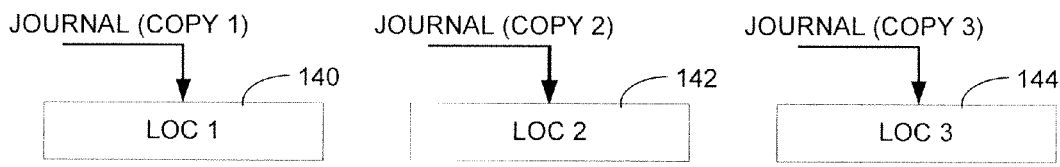
FIG. 8 illustrates storage of journals in different locations.

FIG. 8 illustrates the storage of different copies of a given journal to different locations. A first copy (COPY 1) of the journal is stored in a first memory location 140 (LOC 1), a second copy (COPY 2) of the journal is stored in a different, second location 142 (LOC 2), and a third copy (COPY 3) of the journal is stored in still another location 144 (LOC 3). In one example, the first and second copies are identical copies stored in different erasure blocks 114 in the memory 104. One copy may be stored in an area found to be more reliable or otherwise exhibit superior parametric performance, such as the center of the memory array (center of the die, etc.), and another copy may be stored in an area found to have less optimal parametric performance, such as adjacent an edge of the die.

Figure 9:
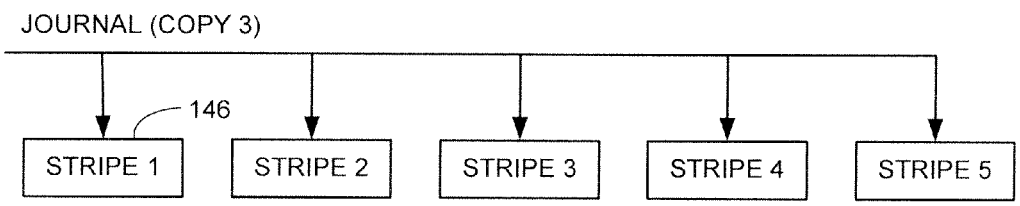
FIG. 9 depicts the use of parity outercodes during the storage of a journal.

The third copy may be virtual copy, such as a checksum or ECC protected copy, or may be a parity copy as depicted in FIG. 9 so that the third location 144 is distributed as five (or some other number of) contiguous or non-contiguous locations. Each location stores a stripe 146 (denoted as STRIPES 1-5) of data that includes the user data and parity data. The parity copy allows successful recovery of data even in the event of the failure of a subset (e.g., one or more stripes) of the data. With reference again to FIG. 8, another embodiment involves appending checksum data to the data stored at the first location 140, ECC to the data stored at the second location 142, and using parity storage at the third location 144.

FIG. 10 illustrates a metadata retrieval engine 150 that operates during an access operation. The engine 150 can be realized in hardware, software or firmware, and can form a portion of the R/W/E circuit 120 or the controller 102. In some embodiments, the same circuitry performs the operations of the metadata retrieval engine 150 and the journal processing engine 130 (FIG. 6).

The engine 150 receives a request for a portion of metadata from a metadata requestor 152. The request may be for a variety of reasons to support ongoing operation of the device 100. The requested metadata may be needed to service a pending read or write operation as discussed in FIG. 4, in which case the metadata may be for a particular GCU (e.g., GCU A). Alternatively, the requested metadata may be to facilitate a garbage collection operation and may constitute data associated with multiple GCUs. The requested metadata may instead be loaded as part of a system initialization process, or for some other purpose.

Regardless, it is contemplated that the request will be for a selected portion of the total metadata set and this may involve accessing at least one snapshot and, potentially, multiple journals. In order to satisfy the request, the engine 150 may need to pull data from the local memory 122, the non-volatile memory 104, or other storage locations within the system. A metadata recovery mechanism 154 may additionally be employed as part of the metadata retrieval process. The recovery mechanism 154 may be a specialized routine executed by the retrieval engine 150 or may be a separate circuit. Once obtained, the requested metadata are returned to the requestor 152.

FIG. 11 provides a top level METADATA RECOVERY routine 160 illustrative of steps carried out by the engine 150 in accordance with some embodiments to service a request for selected metadata. Other sequences and steps may be employed. In FIG. 11, the most recent snapshot is first accessed at step 162 to recover the associated metadata. This provides a baseline for the requested data. It is contemplated that the requested data during this step will involve accessing the associated location(s) in the memory 104 to locate and return the data from Snapshot N (the most recent snapshot). Tables or other data structures can be used to facilitate the location of the requested data in the snapshot.

Data are next recovered from one or more journals at step 164. Should no errors be encountered during the recovery of the data from Snapshot N, step 164 will generally involve locating updates, if any, to the data in the most current journal (Journal N) in accordance with relation (1) above. On the other hand, if the data in the current snapshot is unrecoverable, data from an older snapshot (e.g., Snapshot N−1) and multiple journals (e.g., Journals N−1 and N) will be returned to satisfy the metadata request, in accordance with relations (2)-(3) above.

Once the respective entries from the snapshot(s) and the journal(s) have been recovered, the data are assembled and returned to the requestor at step 166. Metadata entries from the snapshot for which no updated entries are found in subsequent journals) remain unchanged, whereas metadata entries in both the snapshot(s) and the journal(s) require processing by the retrieval engine 150. In some cases, the snapshot may provide an initial value and this value is updated by adding the increments from the subsequent journal to arrive at a final value (e.g., a staleness count, etc.). In other cases, the journal entries supercede the corresponding snapshot entries so that the former are used and the latter are discarded.

FIG. 12 provides a JOURNAL RECOVERY routine 170 that may be carried out in some embodiments during step 164 of FIG. 11. Other sequences and steps may be performed. FIG. 12 involves a multi-tiered voting scheme where multiple journals are concurrently accessed from different locations and EDC is applied as required to ensure validity of the journal data. While FIG. 12 is particularly suitable for maintaining the integrity of the most recent journal (e.g., Journal N), it can be equally applied to other journals, as well as to the various snapshots (or portions thereof).

The requested data is retrieved from a first copy of the journal data at step 172 and from a second copy of the journal at step 174. One of these copies may be in faster memory than the other, and different levels of error detection and correction may be applied to each. Step 176 determines whether the two independently derived data sets match; if not further analysis is provided such as applying outercode EDC to recover the journal data from a third copy at step 178. This third step may be carried out using parity techniques. In some embodiments, the recovery of the third set of outercode protected data may be concurrently initiated during steps 172, 174 so that the data are available if necessary and discarded if not. The data are returned once the system determines the validity of the recovered data at step 180.

In this way, extra EDC protection can be utilized to recover against localized failures of the subset of each journal. The system is robust and compact and adds very little additional operational and storage overhead to the system. Even if the system employs multiple redundant copies of each journal, each journal will be significantly smaller in terms of multiple orders of magnitude as compared to the snapshots.

In some cases, full redundancy of the journals may not be required; it may be sufficient to provide an EDC outer-code scheme that can protect against failures without significantly increasing total overhead. By tailoring the coderate and layout of the outercode to fit the potential failure modes of the memory, enhanced performance may be realized.

The types of EDC codes that are applied can also be adaptively adjusted over time based on system parameters. Historical ECC recovery data for regular user data in different portions of the memory can be tracked, and adjustments can be made for the level of EDC protection for these regions. It will be appreciated that the EDC scheme as employed herein can include multiple copies of the same journals and/or the addition of EDC outercodes such as but not limited to the aforedescribed checksums, Reed-Solomon ECC and parity codes.

While a flash memory array has been provided as an exemplary environment, such is merely for illustration purposes and is not limiting. The techniques disclosed herein are suitable for use in any number of different types of memories, including volatile and non-volatile memories.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
   storing user data in a memory;
   maintaining metadata in the memory associated with the stored user data, the metadata arranged as a first sequence of snapshots of the metadata at different points in time during the operation of the memory and a second sequence of intervening journals which reflect updates to the metadata from one snapshot to the next, each of the intervening journals in the second sequence reflecting the updates to a different one of the snapshots in the first sequence, the first sequence comprising at least two copies of three most recent successive snapshots, the second sequence comprising at least two copies of three most recent successive journals and a virtual copy of the three most recent successive journals distributed and protected against an error condition using an error detection code (EDC); and
   recovering requested metadata from the memory using a selected snapshot in the first sequence and first and second intervening journals in the second sequence responsive to an error condition associated with a more recent snapshot in the first sequence, the second intervening journal in the second sequence occurring at a point in time after generation of the more recent snapshot in the first sequence.

2. The method of claim 1, in which the first journal reflects the updates to the selected snapshot and the second journal reflects the updates to the more recent snapshot.

3. The method of claim 1, in which the first and second journals are both formed after the selected snapshot, the first journal is formed before the more recent snapshot, and the second journal reflects the most recent journal information for the memory.

4. The method of claim 1, in which the first journal comprises error detection and correction (EDC) codes generated in accordance with a first EDC scheme, and the second journal comprises EDC codes generated in accordance with a second EDC scheme.

5. The method of claim 4, in which a selected one of the first or second EDC schemes is a parity code scheme.

6. The method of claim 4, in which a selected one of the first or second EDC schemes is a Reed-Solomon ECC scheme.

7. The method of claim 1, further comprising using the recovered metadata to retrieve a selected block of the stored user data from the memory.

8. The method of claim 1, further comprising retrieving the first and second journals and the selected snapshot from the memory, using the retrieved first journal and the selected snapshot to reconstruct the more recent snapshot, combining the reconstructed more recent snapshot with the second journal to generate the recovered metadata, and using the recovered metadata to write a new block of user data to the memory.

9. The method of claim 1, further comprising using the recovered metadata to schedule a garbage collection operation on a garbage collection unit (GCU) of the memory, the GCU allocated and erased as a unit, the garbage collection operation erasing at least one of the snapshots in the first sequence.

10. The method of claim 1, in which data portions of the first and second journals are respectively retrieved from the memory and validated responsive to a comparison of said data portions.

11. The method of claim 10, further comprising retrieving data from a third journal associated with the first and second journals and applying error detection and correction (EDC) processing to the retrieved data from the third journal.

12. The method of claim 1, the selected snapshot comprising a relatively older snapshot in the first sequence indicative of a state of the metadata at a first time, the first sequence comprising at least one relatively newer snapshot indicative of a different state of the metadata at a different, second time.

13. An apparatus comprising:
a memory arranged into a plurality of garbage collection units (GCUs) each separately allocated and erased as a unit, the memory storing user data in the form of addressable blocks and metadata that provide a logical to physical address correspondence for the user data, the metadata arranged as a first sequence of snapshots of the metadata at different points in time during the operation of the memory and a second sequence of intervening journals of updates to the metadata from one snapshot to the next, each of the journals associated with a different one of the snapshots in the first sequence, the first sequence comprising at least two copies of three most recent successive snapshots, the second sequence comprising at least two copies of three most recent successive journals and a virtual copy of the three most recent successive journals distributed across multiple locations in the memory and protected against an error condition using error detection and correction (EDC) codes; and
a metadata recovery engine adapted to recover selected metadata from the memory using a selected snapshot in the first sequence and first and second intervening journals in the second sequence, the selected snapshot comprising an older snapshot in the first sequence indicative of a state of the metadata at an earlier first time, the first sequence further comprising a newer snapshot indicative of a different state of the metadata at a later second time.

14. The apparatus of claim 13, in which each of the journals in the second sequence is protected by a first type of EDC code, and at least one copy of the most recent journal in the second sequence is further protected by a different, second type of EDC code.

15. The apparatus of claim 13, in which the first journal reflects the changes in the metadata between the older snapshot and the newer snapshot, and the second journal reflects the changes in the metadata since the newer snapshot.

16. The apparatus of claim 13, further comprising a journal processing engine which generates first error detection and correction (EDC) codes for the first journal in accordance with a first EDC scheme and which generates different, second EDC codes for the second journal in accordance with a different, second EDC scheme.

17. The apparatus of claim 16, in which a selected one of the first or second EDC schemes is a parity code scheme.

18. The apparatus of claim 13, in which the metadata retrieval engine recovers the selected metadata using the older snapshot and the first and second journals responsive to a failure to retrieve the newer snapshot.

19. The apparatus of claim 18, in which the metadata retrieval engine further operates to concurrently apply error detection and correction (EDC) processing to a third journal formed after the selected snapshot and to compare a result of said EDC processing to at least a selected one of the first or second journals.

20. The apparatus of claim 13, in which the memory is a flash memory the GCUs are each formed from a plurality of erasure blocks, and the older and newer snapshots are each stored in a different GCU.

* * * * *